May 12, 1942. W. W. COREY 2,282,641
FIRE HYDRANT, STREET LIGHT STANDARD, AND SIMILAR HIGHWAY ACCESSORY
Filed Aug. 14, 1941 2 Sheets-Sheet 1

INVENTOR;
WILLIAM W. COREY
BY Wells R Church
ATTORNEY

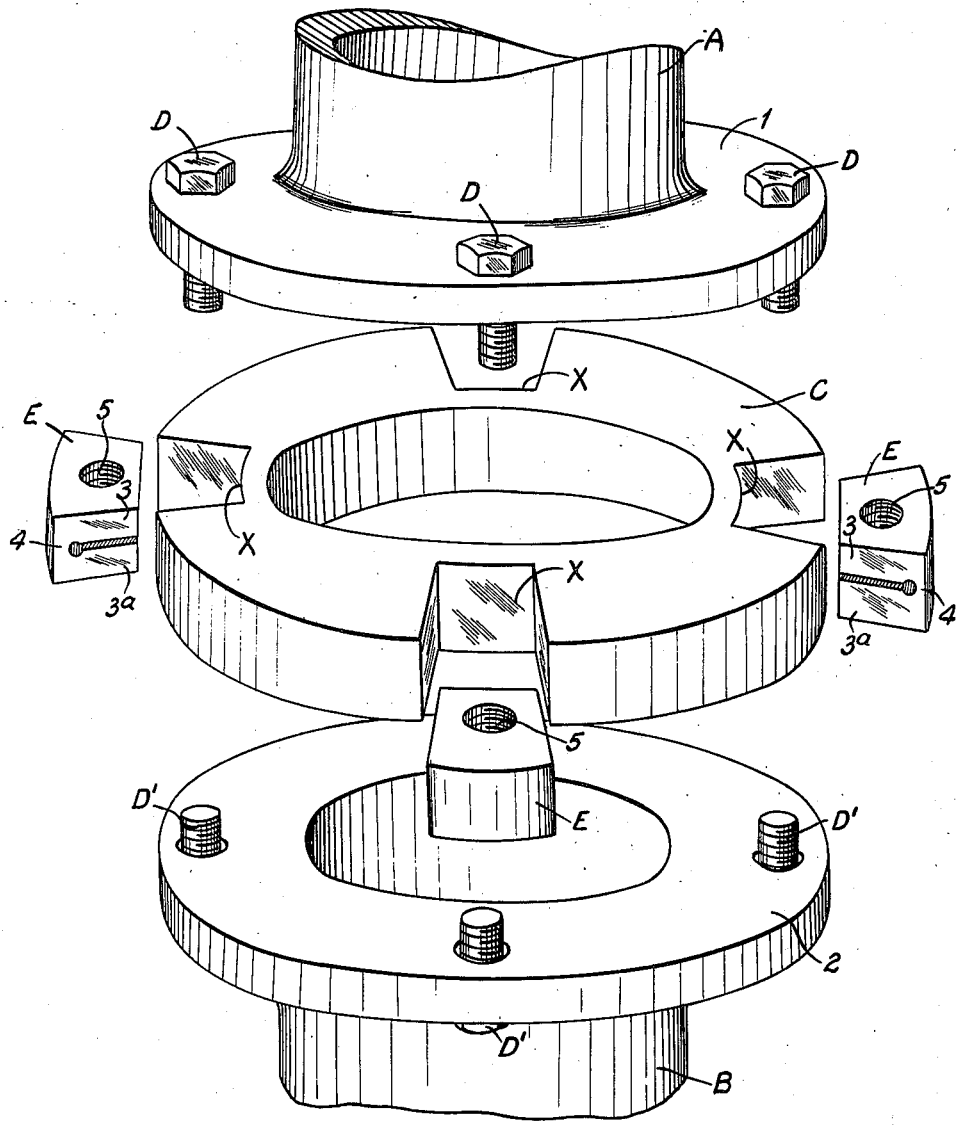

Patented May 12, 1942

2,282,641

UNITED STATES PATENT OFFICE 2,282,641

FIRE HYDRANT, STREET LIGHT STANDARD, AND SIMILAR HIGHWAY ACCESSORIES

William W. Corey, St. Louis, Mo., assignor to Iowa Valve Company, Des Moines, Iowa, a corporation of Iowa Application August 14, 1941, Serial No. 406,847

7 Claims. (Cl. 285—140)

This invention relates to fire hydrants, street light standards and similar highway accessories of the kind that comprise a tubular member mounted in an upright position on a supporting member and joined to the same by a breakable connecting means which is of such design or construction that in the event said upright member is subjected to an abnormal shock or blow, as for example, by a passing vehicle, said connecting means will rupture, thus releasing said upright member and permitting it to move under the force of the impact without causing breakage of the portions of said upright member or supporting member that are engaged by or interlocked with said connecting means.

The main object of my present invention is to provide a breakable connecting means of the kind referred to above, that is inexpensive, easy to install, efficient in operation and capable of use with fire hydrants, street light standards and similar structures that are equipped with conventional integral flanges for receiving the fastening devices used to attach the upright member of the structure to the supporting part on which it is mounted.

Another object is to provide a breakable connecting means of the general kind referred to, which is of such design or construction that when it ruptures, the fastening devices that are positioned in the flanges on the two main members of the structure will not be bent or twisted in such a way as to remain in engagement with both flanges and either exert a twisting strain or pressure on one or the other of the flanges, or prevent, or tend to prevent, the upright member from readily separating from the supporting member. Other objects and desirable features of my invention will be hereinafter pointed out.

Figure 1 of the drawings is a fragmentary side elevational view of a street fire hydrant, showing the tubular top member of the structure secured to the supporting member by a breakable connecting means constructed in accordance with my invention.

Figure 6 is a perspective view on an enlarged scale, showing the co-acting parts of the structure disassembled.

In the accompanying drawings, which illustrate one form of my invention, A designates a part that may consist of the vertically-disposed, tubular member of a fire hydrant, street light standard, or other roadway accessory, and B designates a supporting member on which the member A is mounted in an upright position. Usually, the top member A will consist of a tubular casting provided at its lower end with an integral, horizontally-disposed flange 1, and the supporting member B will consist of an underground pipe, or an extension on an underground pipe, provided with an integral, horizontally-disposed flange 2 arranged parallel to the flange 1 on the top member A. My improved breakable connecting means comprises a ring, collar, or gasket-like, annular member C arranged horizontally between said flanges 1 and 2, separate sets of fastening devices D and D' positioned in the flanges 1 and 2, and a frangible means removably combined with the collar C and detachably connected with said fastening devices D and D', said frangible means being of such construction and being combined with said collar C in such a way that in the event the top member A of the structure is subjected to an abnormal lateral shock or blow, said means will rupture and permit the top member A to yield or move under the force of the impact, without causing breakage of or injury to the flange of either one of the members A or B. Preferably, the collar C is provided with machined surfaces that engage machined surfaces on the flanges 1 and 2, so as to produce tight joints between said parts, but, if desired, gaskets may be interposed between the collar C and the flanges 1 and 2 with which it co-acts.

Figure 4:
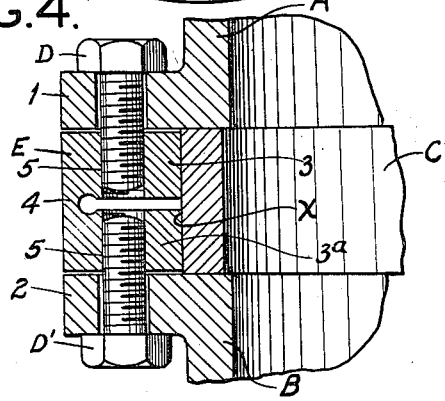
Figure 4 is a fragmentary vertical sectional view, taken on the line 4—4 of Figure 3.

The frangible means previously referred to is preferably formed by a plurality of relatively small, inexpensive, frangible elements E positioned in pockets formed in the collar C. In the form of my invention herein illustrated said pockets consist of open-ended gaps, notches or slots $x$ in the edge of the collar C, and the frangible elements E are positioned in said notches or gaps in such a way that they can either move longitudinally or radially out of said gaps. As shown in the drawings, the frangible elements E are detachably connected to the separate sets of fastening devices D and D' by co-acting screw threads on said parts. My broad idea contemplates constructing the frangible means of the structure in various ways and combining said frangible means in various ways with the collar or gasket-like member C, but I have obtained good results with frangible elements of the kind herein shown, each of which is composed of two superimposed parts 3 and 3ª, separated by a slot and joined together at one end by a web 4. The top part 3 is provided with an internally screw-threaded hole 5 that is adapted to receive one of the screws D that projects downwardly through the flange 1 on the top member A, and the underneath part 3ª is provided with a similar internally-screw-threaded hole (see Figure 4) that receives one of the screws D' which projects upwardly through the flange 2 on the supporting member B.

Figure 1:
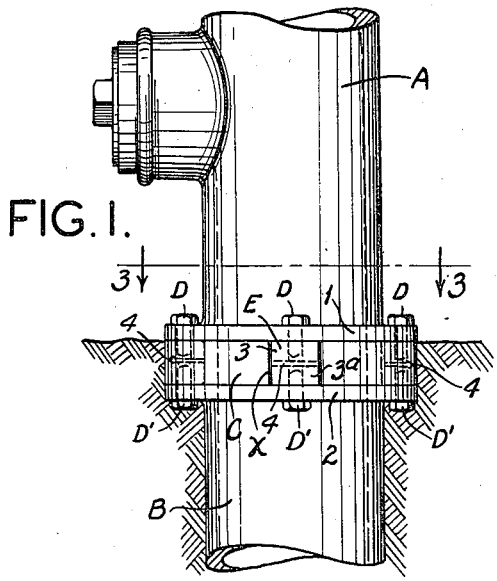
Figure 2:
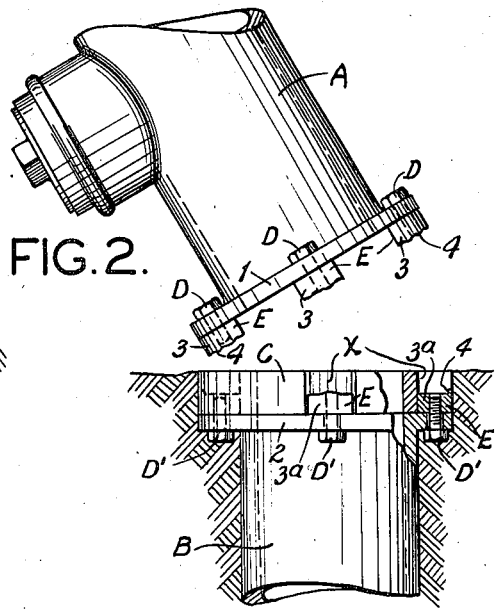
Figure 2 is a similar view, showing how said connecting means ruptures and releases the top member of the structure in the event said top member is subjected to an abnormal shock or blow.
Figure 3:
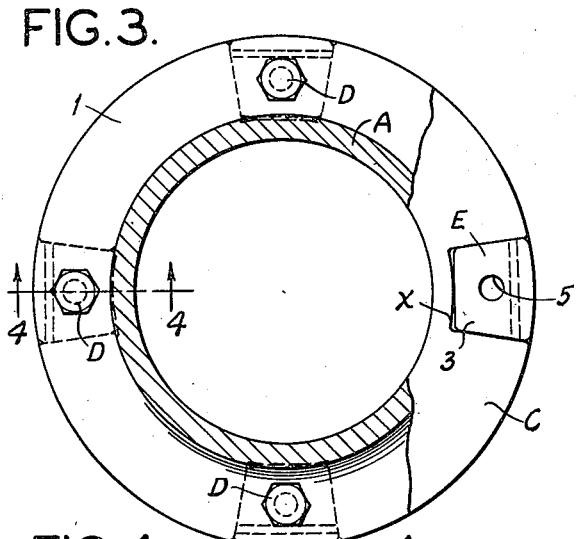
Figure 3 is an enlarged horizontal sectional view, taken on the line 3—3 of Figure 1.
Figure 5:
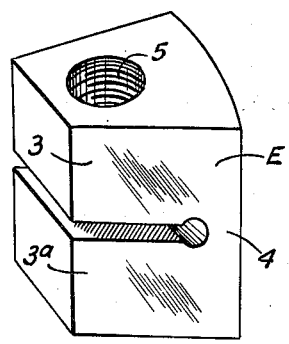
Figure 5 is a perspective view of one of the frangible elements.

When the two sets of fastening devices D and D' are tightened, the flanges 1 and 2 of the members A and B, respectively, will be drawn into tight engagement with the collar C, thereby producing tight joints between said parts, and also causing the top member A of the structure to be firmly supported in an upright position. The operation of setting up or tightening the fastening devices D and D' also causes the frangible elements E to be placed under tension, due, to the fact that each pair of opposed fastening devices D and D' exert strains on the particular frangible element with which they co-act, in directions tending to separate the top and bottom portions 3 and 3a of said frangible element, or tending to cause the web 4 to rupture in the event abnormal strains or forces are thereafter exerted on the frangible element in directions tending to pull the top and bottom portions of same apart. It will thus be seen that under normal conditions the top member A is held firmly in an upright position and is prevented from turning relatively to the supporting member B by the co-action or co-operation of the fastening devices D and D' in the flanges 1 and 2 with the frangible elements E positioned in the gaps or notches $x$ in the edge of the intermediate annular member C, said frangible elements E being maintained under such tension that if the top member A of the structure is subjected to an abnormal shock or blow in a direction tending to tip it sidewise, the additional strain exerted on the web portions 4 of the frangible elements will cause said web portions to rupture, thus releasing the top member A and permitting said member to topple over or move under the force of the impact, as shown in Figure 2.

One very desirable feature of a connecting means of the construction above described is that the top member A of the structure is capable of tilting or toppling over without liability of bending the fastening devices D and D', and causing said fastening devices to break or exert destructive strains on the flanges 1 and 2, and without liability of said fastening devices remaining in engagement with both flanges, and thus interfering with the separation of the top member A from the supporting member B. Such a connecting means is easy to install, it is capable of use with fire hydrants, street light standards and underground pipe equipped with conventional integral flanges, and it permits a structure of the kind referred to be repaired at a low cost, after the upright member of same has been knocked over, inasmuch as the only parts which have to be replaced consist of small, inexpensive devices (the frangible elements E) which can be constructed cheaply from metal castings or from small blocks of metal, each of which has a saw kerf or slot extending part-way through the same.

While I prefer to construct the frangible elements in the form of devices, each of which comprises two superimposed parts joined together at one end by a connecting web, I wish it to be understood that the frangible means could be constructed and arranged in various ways, so long as the frangible means of the structure comprises parts removably positioned in pockets in an intermediate, gasket-like member C, and detachably combined with separate sets of fastening devices positioned in flanges on the top and bottom members of the structure in such a way that the strain or pull exerted by said fastening devices on said frangible parts when the top member of the structure is subjected to an abnormal blow or shock, causes said frangible parts to rupture, thus releasing the top member of the structure and permitting it to readily pull away from the supporting member without breaking any portion of the top member or bottom member, and without causing the fastening devices D or D' to become bent and remain in engagement with both of the flanges 1 and 2 in such a way as to interfere with the movement of the top member A away from the supporting member B.

Having thus described my invention, what I claim as new and desire to secure by Letters Patent is:

1. A fire hydrant, street light standard or similar highway accessory, comprising an upright member, a supporting member, a collar or annular-shaped part between said members, frangible means removably combined with said collar, and fastening devices in said upright member and supporting member detachably engaged with said frangible means and disposed so as to draw said members into tight engagement with said collar.

2. A structure of the kind described in claim 1, in which said frangible means is composed of a plurality of frangible elements positioned in pockets in said collar.

3. A structure of the kind described in claim 1, in which the collar is interposed between flanges on said upright member and supporting member, and the fastening devices are positioned in said flanges.

4. A structure of the kind described in claim 1, in which the upright member and supporting member are provided with flanges that embrace the collar or annular shaped part, and said annular-shaped part is provided in its edge with gaps or notches that receive the frangible means of the structure.

5. A breakable connecting means for joining a fire hydrant or similar flanged tubular member to a flanged supporting member, comprising a collar adapted to be positioned between flanges on said tubular member and supporting member and provided with pockets, frangible elements removably mounted in said pockets and each comprising separable portions, and separate sets of fastening devices adapted to be positioned in the flanges on said tubular member and supporting member and detachably connected with the separable portions of said frangible elements.

6. A breakable connecting means of the kind described in claim 5, in which said pockets are formed by open-ended gaps or notches in the edge of said collar, and each frangible element has two superimposed separable portions connected together at one end by an integral web portion.

7. A fire hydrant, street light standard or similar highway accessory, comprising an upright tubular member provided with a flange, a supporting member provided with a flange, a gasket-like member interposed between said flanges and provided at its periphery with a plurality of open-ended notches or slots, frangible elements removably mounted in said slots and each comprising two complementary portions joined by a breakable part, and pairs of opposed fastening devices in the flanges of said upright member and supporting member, detachably connected with the complemental portions of said frangible elements.

WILLIAM W. COREY.